United States Patent [19]

Smitley

[11] 4,276,951
[45] Jul. 7, 1981

[54] VEHICULAR ENERGY STORING MEANS AND SYSTEM

[75] Inventor: Marion L. Smitley, Birmingham, Mich.

[73] Assignee: Colt Industries Operating Corp, New York, N.Y.

[21] Appl. No.: 30,567

[22] Filed: Apr. 16, 1979

Related U.S. Application Data

[63] Continuation-in-part of Ser. No. 796,754, May 13, 1977, abandoned.

[51] Int. Cl.³ .............................................. B60K 9/04
[52] U.S. Cl. ..................................... 180/165; 60/414; 74/751; 192/0.055
[58] Field of Search ............. 180/165, 54 R; 192/3 R, 192/4 A, 0.055, 0.072, 0.094, 48.4, 48.9; 60/413, 414; 74/751, 572

[56] References Cited

U.S. PATENT DOCUMENTS

| | | | |
|---|---|---|---|
| 2,656,733 | 10/1953 | Dicke | 180/165 |
| 2,803,151 | 8/1957 | Clerk | 180/165 |
| 3,665,788 | 5/1972 | Nyman | 180/165 |
| 3,749,194 | 7/1973 | Bardwick | 180/165 |
| 3,882,950 | 5/1975 | Strohlein | 180/165 |
| 3,886,810 | 6/1975 | Sugiyama | 180/165 |
| 4,187,741 | 2/1980 | Nyman | 74/751 |

FOREIGN PATENT DOCUMENTS 2641886  3/1978  Fed. Rep. of Germany ........... 180/165

Primary Examiner—David M. Mitchell
Attorney, Agent, or Firm—Walter Potoroka, Sr.

[57] ABSTRACT

A rotatable flywheel is selectively operatively connectable to the power drive train of a related vehicle and is effective to absorb energy from the vehicular ground-engaging drive wheels during vehicle deceleration thereby also providing for at least a degree of vehicular braking; a clutch is provided to enable the vehicular ground-engaging drive wheels to accelerate the flywheel while preventing the flywheel from driving such wheels through such clutch; an additional clutch is shown as being provided to enable selectively variable degrees of operative connection between the wheels and flywheel; and a related control is provided for affecting such selectively variable degrees of operative connection.

19 Claims, 3 Drawing Figures

VEHICULAR ENERGY STORING MEANS AND SYSTEM

RELATED APPLICATION

This application is a continuation-in-part of my copending application Ser. No. 796,754 filed May 13, 1977, for "Vehicular Energy Storing Means and System", now abanoned.

BACKGROUND OF THE INVENTION

It has generally been realized by the prior art that the use of flywheels in automotive type vehicles could reduce vehicular fuel consumption and also reduce the level of atmospheric pollutants arising from vehicle exhaust emissions. Heretofore the prior art has proposed the use of a flywheel within mostly mass transit type of vehicles, usually referred to as buses, wherein the flywheel was operated generally in combination with an electric motor-generator. That is, for example, in one particular prior art embodiment, the vehicle (a bus) drew electric current as from overhead wires to operate an electric motor-generator which, in turn, was connected to a flywheel situated under the floor of the bus. When the motor-generator had the flywheel rotating at approximately 3,000 r.p.m. the bus operator would break contact with the overhead wires and the electric motor would start to function as a generator and would be driven by the rotating flywheel. The generator thusly driven would supply electrical energy to conventional electric drive motors situated at the vehicle drive wheels. In this arrangement, it can be seen that the flywheel was employed purely as a storage or reservoir for the sole power for propelling the vehicle. Unfortunately, the energy thusly stored was sufficient to propell the vehicle less than a mile before the flywheel had to again be driven up to 3,000 r.p.m., or designated speed by use of overhead wires and the associated motor-generator. A most impractical use of the flywheel in attempting to conserve energy.

The prior art is again suggested in adoption of a like system with the further improvement of providing regenerative braking. That is, as the bus or trolly descends a hill, upon application of the brakes, means are provided for employing the flywheel as part of the braking force thereby transferring such part of the braking energy back into the flywheel. It is estimated that in such a system two-thirds of the energy required to ascend a hill will be recouped during the descent thereof. Unfortunately, the system is still one where the flywheel becomes the sole reservoir of energy for propelling the vehicle and at regular intervals requires regneration as from overhead electrical wires or the like.

None of the prior art approaches to the use of flywheels has been shown to be acceptable especially for use in automotive vehicles of the passenger type or the like.

Accordingly, the invention as herein disclosed and described is primarily directed to the solution of the above shortcomings and problems of the prior art as well as to the practical adaptation of a flywheel as an energy storing device for automotive type vehicles.

SUMMARY OF THE INVENTION

According to the invention, an energy storing and supplying system for a vehicle having a prime mover and surface-engaging vehicular propelliing drive wheel means, comprises vehicular primary power transmitting means operatively interconnecting said prime mover and said drive wheel means, a flywheel, and secondary power transmitting means operatively connected to said drive wheel means and to said flywheel, said secondary power transmitting means being effective during a first condition of operation of said vehicle for transmitting energy from said vehicle drive wheel means and into said flywheel means as to thereby impart rotation to said flywheel means, said secondary power transmitting means being effective during a second condition of operation of said vehicle for transmitting energy from said flywheel during its rotation and into said drive wheel means as to at least assist in propelling said vehicle.

Various general and specific objects and advantages of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views.

DETAILED DESCRIPTION OF THE PREFERRED EMBODIMENT

Figure 1:
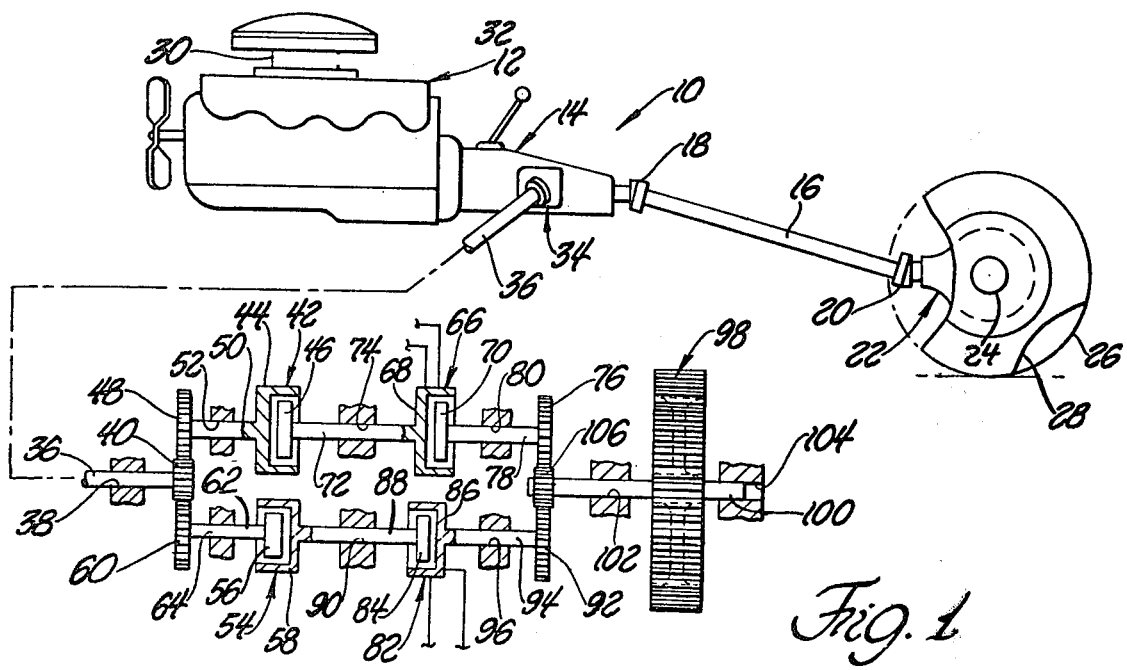
FIG. 1 is a somewhat simplified view of an automotive vehicle equipped with flywheel means according to teachings of the invention.

Referring now in greater detail to the drawings, FIG. 1 illustrates a vehicle 10 comprising a combustion engine 12 supplying power through a related transmission assembly 14 (which may be of the variable speed gear type), drive shaft 16 with front and rear universal joint assemblies 18 and 20, differential gearing assembly 22, drive axle means 24 and ground-engaging vehicle drive wheels 26 and 28. The engine 12 may be provided with any suitable motive fluid induction means 30 and any suitable throttle valve means which is operatively connected as to related throttle control linkage means a portion of which is illustrated at 32.

Suitable power take-off means 34, such as that, for example, employed in four-wheel-drive vehicles, serves to transmit power from the transmission means 14 along shaft 36, journalled as at 38, to a gear 40.

First over-running clutch assembly means 42, many suitable and specific types of which are well known in the art, comprises first clutch member means 44 and second clutch member means 46 which are, under a particular condition of operation, rotatable relative to each other while under a second condition of operation form a drive train therebetween. The first clutch member means 44 is rotatably fixedly connected to a gear 48 as through a shaft 50 journalled as at 52.

Second over-running clutch assembly means 54 similarly comprises first clutch member means 56 and second clutch member means 58 which are, under a first particular condition of operation, rotatable relative to each other while under a second condition of operation form a drive train therebetween. The first clutch member means 56 is rotatably fixedly connected to a gear 60 as through a shaft 62 journalled as at 64.

First magnetic clutch assembly means 66, many suitable and specific types of which are well known in the art, is illustrated as comprising first magnetic clutch member means 68 and second magnetic clutch member means 70 which, as is generally well known in the art, depending upon the degree of electrical energization thereof will be, in varying degrees, rotatable with respect to each other and under certain circumstances even form a direct drive train therethrough. The first magnetic clutch member means 68 is rotatably fixedly connected to the second clutch member means 46, of first over-running clutch assembly 42, as through a shaft 72 journalled as at 74. The second magnetic clutch member means 70 is rotatably fixedly connected to a gear 76 as through a shaft 78 journalled as at 80.

Second magnetic clutch assembly means 82 similarly comprises first magnetic clutch member means 84 and second magnetic clutch member means 86 which, as is generally well known in the art, depending upon the degree of electrical energization thereof will be, in varying degrees rotatable with respect to each other and under certain circumstances even form a direct drive train therethrough. The first magnetic clutch member means 84 is rotatably fixedly connected to the second clutch member means 58, of second over-running clutch assembly 54, as through a shaft 88 journalled as at 90. The second magnetic clutch member means 86 is rotatably fixedly connected to a gear 92 as through a shaft 94 journalled as at 96.

A flywheel 98 is rotatably fixedly secured to a shaft 100, journalled as at 102 and 104, which, in turn, is fixedly secured to a gear 106 which is in meshed engagement with gears 76 and 92.

Figure 2:
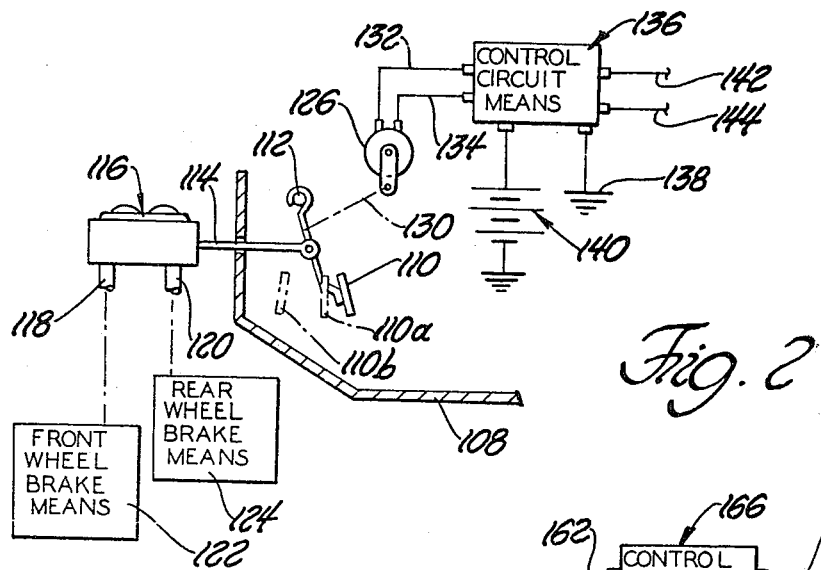
FIG. 2 is a somewhat simplified view of a related portion of the associated vehicle illustrating related control components.

In FIG. 2 a portion of the vehicular floor pan is illustrated at 108 with a operator-actuated vehicle brake system pedal or lever 110 pivotally supported as at 112. As is generally well known in the art, the brake pedal 110 is operatively connected as through related linkage means 114 to associated vehicular master brake cylinder means 116, also well known in the art. Suitable related hydraulic conduit means 118 and 120 communicating with the master cylinder assembly 116 may lead respectively to the vehicular front wheel braking means 122 and rear wheel braking means 124.

A potentiometer 126 is operatively connected as by related motion transmitting means 130 to brake pedal means 110 as to be adjustable in relation to the movement of such brake pedal 110. The potentiometer 126 is connected as by conductors 132 and 134 to related electrical control circuit means 136 which is shown as being electrically connected to a related source of electrical potential 140. Related electrical conductor means 142 and 144 serve to electrically interconnect control circuit means 136 with the magnetic clutch assembly means 66.

Figure 3:
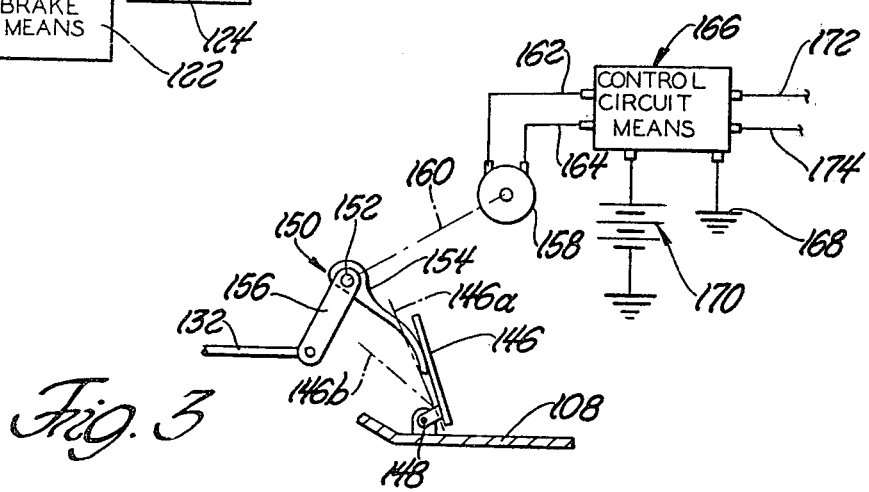
FIG. 3 is a somewhat simplified view of another related portion of the associated vehicle illustrating other related control components.

FIG. 3 illustrates the vehicular throttle valve operator foot-operated pedal or lever 146, pivotally secured as at 148, to the vehicle floor pan 108. A related bellcrank assembly 150, comprising a journalled shaft 152 and levers 154, 156, has its lever 154 in operative engagement with throttle foot pedal 146 while lever 156 is operatively connected to throttle valve actuating linkage.

A potentiometer 158 is operatively connected as to bellcrank shaft 152 by related motion transmitting means 160 in order to thereby be adjustable in relation to the rotation of bellcrank means 150 and consequently the movement, in the throttle opening direction, of throttle foot pedal 146. Electrical conductor means 162 and 164 serve to interconnect potentiometer means 158 with related electrical control circuit means 166 which is shown as being electrically grounded as at 168 and electrically connected to a related source of electrical potential 170. Electrical conductor means 172 and 174 serve to electrically interconnect control circuit means 166 with the magnetic clutch assembly means 82. It is, of course, conceivable that sources of electrical potential 140 and 170 may actually be one and the same and it is also conceivable that the control means generally separately indicated at 136 and 166 may actually be combined as to define a single identifiable control circuit means providing the functions ascribed to both.

OPERATION OF THE INVENTION

Generally, as can be seen and in view of the preceding description, vehicular drive wheels 26, 28 and power take-off shaft means 36 are operatively interconnected so that the speed of rotation of shaft 36 is related to the speed of rotation of main drive shaft 16 and the rotation of wheels 26 and 28. In other words, with the vehicle 10 in motion gear 40 will be rotated at some speed related to the speed of drive shaft 16 and generally related to the speed of the vehicle 10 with such relationship being somewhat modified during turning movements of the vehicle 10 because of the action of differential gearing assembly 22.

As a consequence of gear 40 rotating whenever the vehicle 10 is in motion, gears 48 and 60, engaged therewith, are also in motion thereby causing shafts 50 and 62 and clutch member means 44 and 56 to also rotate.

The first over-running or one-way clutch assembly means 42 is so arranged as to be effective for transmitting power from vehicle drive wheels 26, 28 (through shaft 16 and take-off shaft means 36) to the flywheel 98. In other words, the clutch assembly 42 functions in its over-running mode whenever the flywheel 98 should attempt to transmit power from itself to the vehicle drive wheels 26, 28. This then means that shaft 72 is able to rotate at speeds greater than shaft 50.

The second over-running or one-way clutch assembly means 54 is so arranged as to be effective for transmitting power from the flywheel 98 (through gears 60, 40 shaft 36, transmission 14 and drive shaft 16) to vehicle drive wheels 26 and 28. In other words, the clutch assembly 54 functions in its over-running mode whenever the drive wheels 26, 28 should attempt to transmit power from themselves to the flywheel. This then means that the engine 12 is able to drive shaft 62 at a rotational speed faster than the speed at which flywheel 98 drives shaft 88.

From the preceding it can be seen that the invention thus far described provides two general paths by which power or energy can be transmitted to and from the flywheel 98. That is, a first power train exists by which power or energy can be transmitted to flywheel 98 with such power train comprising drive wheels 26, 28, drive shaft 16, transmission 14 and power take-off shaft means 36, gear 40, gear 48, shaft 50, one-way clutch assembly 42, shaft 72, magnetic clutch assembly 66, shaft 78, gear 76, gear 106 and shaft 100. A second power train by which the flow of power or energy is reversed, that is, from flywheel 98 to drive wheels 26, 28 comprises shaft 100, gear 106, gear 92, shaft 94, magnetic clutch assembly 82, shaft 88, one-way clutch assembly 54, shaft 62, gear 60, gear 40, shaft means 36, transmission 14 and wheels 26, 28.

Engine 12 cannot transmit energy directly to the flywheel 98 since the over-running clutch assembly 54 will not transmit energy from shaft 62 to shaft 88. Even though the engine does transmit energy through over-running clutch 44, it cannot transmit power through magnetic clutch 66 unless clutch 66 is energized by potentiometer 126, the latter occurring only when the brake pedal 110 is depressed to apply the brakes. That is, power is transmitted to the flywheel only when the brake is being applied, which activates the magnetic clutch so as to store energy in the flywheel. Under these conditions, the engine 12 is at idle condition and unable to produce any significant power. However, no power can be transmitted to the flywheel unless the brake pedal is applied to slow the vehicle. The braking energy is normally dissipated in the form of heat in the brake system; however, with the use of the invention, a portion of the braking energy is transmitted to and stored in the flywheel 98.

The magnetic clutch means 66 and 82 are employable for varying the degree of torque (power or energy) to be transmitted therethrough. That is, as generally depicted and broadly disclosed, the vehicular brake pedal 110 is operatively electrically connected to magnetic (or electro-magnetic) clutch assembly means 66. Accordingly, let it be assumed that during normal or gradual deceleration (without application or energization of the associated vehicular braking system) clutch means 66 is completely de-energized so as to transmit no power from shaft 72 to shaft 78. During such deceleration, of course, the vehicle is coasting freely and no energy is transmitted from the drive wheels 26, 28 to the flywheel 98.

Further, the potentiometer 126 and related circuit means 136 may be so adjusted as to exhibit varying degrees of actuation of the clutch means 66. For example, such could be arranged so that as brake pedal 110 is moved from its position shown to that position depicted in phantom line at 110a, the degree of energization of clutch means 66 could progressively increase from 0% to 100%. This, in turn, would mean that there would be progressively less "slippage" through such clutch means 66 thereby progressively increasing the amount of power being transmitted from the decelerating vehicle to the flywheel 98. The position of the brake pedal 110 depicted at 110b could correspond to a maximum energization of the associated vehicle brake system. In any event, the potentiometer means 126, circuit means 136 and clutch means 66 provide an overall means whereby the operator still can exhibit full control over the vehicle and make full use of the associated vehicular braking system should a faster deceleration be desired than that which the flywheel is capable of providing and to provide for decelerating or stopping the vehicle below the speed at which the gear ratio of the flywheel is capable of handling as described above. The flywheel (due to feeding energy into it) assists the vehicle braking system within its design capability. As should be apparent, with the system of the invention, the flywheel 98 will continue rotating, in a free mode, even while the vehicle is stopped and standing still.

The energy thusly stored in the flywheel 98, as described, can then be employed for moving or accelerating the associated vehicle. Such is accomplished through the power train previously described and comprising clutch assembly means 54 and 82.

For example, let it be assumed that the vehicle is standing still and that the flywheel 98 is rotating because of the energy previously transmitted thereto. Also, at this time let it be assumed that throttle operating foot-lever 146 is in its position shown in FIG. 3. (Even though lever 146 is referred to as being operatively connected to throttle means it should be apparent that the expression, throttle, or, throttle means, is meant to encompass any device, structure or means for controlling either: (a) the rate of motive fluid supplied to the engine or prime mover 12 or (b) the rate of electrical energy being supplied to any prime mover or motor functionally equivalent to engine 12.)

Now let it be assumed that it is desired to either place the vehicle in motion (or to accelerate it). As the throttle pedal 146 is depressed to the position generally depicted at 146a, the potentiometer means 158 and circuit means 166 become effective for progressively energizing magnetic (or electromagnetic) clutch assembly means 82 whereby such clutch assembly means 82 become progressively more effective for progressively transmitting an increasing amount of power or torque therethrough as to thereby enable flywheel 98 to gradually and smoothly transmit power or energy from itself to gear 60, shaft means 36 and drive wheels 26, 28. The position of pedal 146 depicted at 146b could correspond to a wide open throttle or maximum engine load condition. Again as described above the flywheel (with its stored energy) will assist the engine to the limit of its capability in accelerating the vehicle.

In view of the preceding, it can be seen that the invention provides flywheel energy recovering means effective for storing therein energy obtained as during deceleration of the associated vehicle and effective for, in turn, supplying such stored energy back to the associated vehicle's drive wheel means in order to thereby assist in the propelling of such vehicle.

Although only a preferred embodiment of the invention has been disclosed and described it should be apparent that other embodiments and modifications of the invention are possible within the scope of the appended claims.

I claim:

1. An energy storing and supplying system for a vehicle having a prime mover and surface-engaging vehicular propelling drive wheel means, comprising vehicular primary power transmitting means operatively interconnecting said prime mover and said wheel means, a flywheel, and secondary power transmitting means operatively connected to said drive wheel means and to said flywheel, said secondary power transmitting means being effective during a first condition of operation of said vehicle for transmitting energy from said vehicle drive wheel means and into said flywheel as to thereby impart rotation to said flywheel, said secondary power transmitting means being effective during a second condition of operation of said vehicle for transmitting energy from said flywheel during its rotation and into said drive wheel means as to at least assist in propelling said vehicle, said secondary power transmitting means including clutching means to prevent during all conditions of operation of said vehicle the transfer of any power from said prime mover to said flywheel and from said flywheel to said prime mover.

2. An energy storing and supplying system according to claim 1, and further comprising operator positionable brake actuating means for actuating vehicular brake system means associated with said vehicle, and control means operated in response to the positioning of said brake actuating means, said control means being effective to at times control the clutching action of said clutching means and thereby permit only a portion of the energy available from said vehicle drive wheel means to be transmitted to said flywheel.

3. An energy storing and supplying system according to claim 1, and further comprising operator positionable throttle actuating means for variably determining the position of throttle means associated with said prime mover, and control means operated in response to the positioning of said throttle means, said control means being effective to at times control the clutching action of said clutching means and thereby permit only a portion of the energy available from said flywheel to be transmitted to said drive wheel means.

4. An energy storing and supplying system according to claim 1, and further comprising operator positionable brake actuating means for actuating vehicular brake system means associated with said vehicle, first control means operated in response to the positioning of said brake actuating means, said first control means being effective to at times control the clutching action of said clutching means and thereby permit only a portion of the energy available from said drive wheel means to be transmitted to said flywheel, operator positionable throttle actuating means for variably determining the position of throttle means associated with said prime mover, and second control means operated in response to the positioning of said throttle means, said second control means being effective to at times control the clutching action of said clutching means and thereby permit only a portion of the energy available from said flywheel to be transmitted to said drive wheel means.

5. An energy storing and supplying system for a vehicle having a prime mover and surface-engaging vehicular propelling drive wheel means, comprising vehicular primary power transmitting means operatively interconnecting said prime mover and said wheel means, a flywheel, and secondary power transmitting means operatively connected to said drive wheel means and to said flywheel, said second power transmitting means being effective during a first condition of operation of said vehicle for transmitting energy from said vehicle drive wheel means and into said flywheel as to thereby impart rotation to said flywheel, said secondary power transmitting means being effective during a second condition of operation of said vehicle for transmitting energy from said flywheel during its rotation and into said drive wheel means as to at least assist in propelling said vehicle, said secondary power transmitting means including clutching means to prevent transfer of power from said prime mover to said flywheel and from said flywheel to said prime mover, said secondary power transmitting means comprising a first secondary drive train and a second secondary drive train in mechanically parallel relationship to each other, said clutching means comprising first clutch means and second clutch means, said first secondary drive train comprising said first clutch means and effective for preventing the transmission of a working torque therethrough except in a first direction of transmission, and said second secondary drive train comprising said second clutch means and effective for preventing the transmission of a working torque therethrough except in a second direction of transmission opposite to said first direction.

6. An energy storing and supplying system for a vehicle having a prime mover and surface-engaging vehicular propelling drive wheel means, comprising vehicular primary power transmitting means operatively interconnecting said prime mover and said wheel means, a flywheel, and secondary power transmitting means operatively connected to said drive wheel means and to said flywheel, said secondary power transmitting means being effective during a first condition of operation of said vehicle for transmitting energy from said vehicle drive wheel means and into said flywheel as to thereby impart rotation to said flywheel, said secondary power transmitting means being effective during a second condition of operation of said vehicle for transmitting energy from said flywheel during its rotation and into said drive wheel means as to at least assist in propelling said vehicle, said secondary power transmitting means including clutching means to prevent transfer of power from said prime mover to said flywheel and from said flywheel to said prime mover, said secondary power transmitting means comprising a first secondary drive train and a second secondary drive train in mechanically parallel relationship to each other, said clutching means comprising first and second clutch means, said first and second clutch means comprising at least a portion of said first secondary drive train, said first clutch means being effective for preventing the transmission of a working torque therethrough except in a first direction of transmission, and said second clutch means being effective to vary the magnitude of said working torque transmitted through said first clutch means in said first direction.

7. An energy storing and supplying system for a vehicle having a prime mover and surface-engaging vehicular propelling drive wheel means, comprising vehicular primary power transmitting means operatively interconnecting said prime mover and said wheel means, a flywheel, and secondary power transmitting means operatively connected to said drive wheel means and to said flywheel, said secondary power transmitting means being effective during a first condition of operation of said vehicle for transmitting energy from said vehicle drive wheel means and into said flywheel as to thereby impart rotation of said flywheel, said secondary power transmitting means being effective during a second condition of operation of said vehicle for transmitting energy from said flywheel during its rotation and into said drive wheel means as to at least assist in propelling said vehicle, said secondary power transmitting means including clutching means to prevent transfer of power from said prime mover to said flywheel and from said flywheel to said prime mover, said clutching means comprising first second third and fourth clutch means, said secondary power transmitting means comprising a first secondary drive train and a second secondary drive train in mechanically parallel relationship to each other, said first and second clutch means comprising at least a portion of said first secondary drive train, said first clutch means being effective for preventing the transmission of a working torque therethrough except in a first direction of transmission, said second clutch means being effective to vary the magnitude of said working torque transmitted through said first clutch means in said first direction, third and fourth clutch means comprising at least a portion of said second secondary drive train, said third clutch means being effective for preventing the tranmission of a working torque therethrough except in a second direction of transmission opposite to said first direction, and said fourth clutch means being effective to vary the magnitude of said working torque transmitted through said third clutch means in said second direction.

8. An energy storing and supplying system according to claim 7 wherein said first and third clutch means each comprise an over-running one-way clutch assembly, and wherein said second and fourth clutch means each comprise an electromagnetic clutch assembly.

9. An energy storing and supplying system according to claim 8 wherein said first secondary drive train comprises first and second gear means respectively operatively connected at first and second opposite effective ends thereof, wherein said second secondary drive train comprises third and fourth gear means respectively operatively connected at third and fourth opposite effective ends thereof, wherein said first and third gear means are in meshed engagement with fifth gear means operatively connected to said drive wheel means, and wherein said second and fourth gear means are in meshed engagement with sixth gear means operatively connected to said flywheel.

10. An energy storing and supplying system according to claim 9 wherein said primary power transmitting means comprises a variable speed transmission assembly, drive shaft means operatively coupled to said transmission assembly and to differential gearing means, and wherein said fifth gear means is connected to said drive wheel means by operative connection to said transmission assembly.

11. An energy storing and supply system for a vehicle having an engine for driving the vehicle and surface-engaging vehicle propelling drive wheel means, said system comprising first drive means between the engine and the drive wheel means, said first drive means including a variable speed transmission, a power take-off from said transmission, a flywheel, and a second drive means between said power take-off and said flywheel, said second drive means comprising first and second parallel drive trains, each of said drive trains having a one-way over-running clutch and a variable clutch, said first and second drive trains and said clutches being effective to prevent said engine from directly driving said flywheel during any condition of operation of said vehicle, said first drive train and said clutches therein being effective to enable said drive wheel means to drive the engine and said flywheel through said power take-off during vehicle deceleration whenever the speed of said flywheel is less than that of said power takeoff, and said second drive train and said clutches therein being effective to enable said flywheel to drive the drive wheel means upon vehicle acceleration whenever the speed of said power take-off is less than that of said flywheel.

12. An energy storing and supplying system for a vehicle having a prime mover and surface-engaging vehicular propelling drive wheel means, comprising vehicular primary power transmitting means operatively interconnecting said prime mover and said wheel means, a flywheel, and secondary power transmitting means operatively connected to said drive wheel means and to said flywheel, said secondary power transmitting means being effective during a first condition of operation of said vehicle for transmitting energy from said vehicle drive wheel means and into said flywheel as to thereby impart rotation to said flywheel, said secondary power transmitting means being effective during a second condition of operation of said vehicle for transmitting energy from said flywheel during its rotation and into said drive wheel means as to at least assist in propelling said vehicle, said secondary power transmitting means including clutching means to prevent transfer of power from said prime mover to said flywheel and from said flywheel to said prime mover, said clutching means comprising first and second clutch means, said secondary power transmitting means comprising a first secondary drive train and a second secondary drive train, said first clutch means comprising at least a portion of said first secondary drive train and effective for preventing the transmission of a working torque therethrough except in a first direction of transmission, and said second clutch means comprising at least a portion of said second secondary drive train and effective for preventing the transmission of a working torque therethrough except in a second direction of transmission opposite to said first direction.

13. An energy storing and supplying system for a vehicle having a prime mover and surface-engaging vehicular propelling drive wheel means, comprising vehicular primary power transmitting means operatively interconnecting said prime mover and said wheel means, a flywheel, and secondary power transmitting means operatively connected to said drive wheel means and to said flywheel, said secondary power transmitting means being effective during a first condition of operation of said vehicle for transmitting energy from said vehicle drive wheel means and into said flywheel as to thereby impart rotation to said flywheel, said secondary power transmitting means being effective during a second condition of operation of said vehicle for transmitting energy from said flywheel during its rotation and into said drive wheel means as to at least assist in propelling said vehicle, said secondary power transmitting means including clutching means to prevent transfer of power from said prime mover to said flywheel and from said flywheel to said prime mover, said clutching means comprising first and second clutch means, said secondary power transmitting means comprising a first secondary drive train and a second secondary drive train, said first and second clutch means comprising at least a portion of said first secondary drive train, said first clutch means being effective for preventing the transmission of a working torque therethrough except in a first direction of transmission, and said second clutch means being effective to vary the magnitude of said working torque transmitted through said first clutch means in said first direction.

14. An energy storing and supplying system for a vehicle having a prime mover and surface-engaging vehicular propelling drive wheel means, comprising vehicular primary power transmitting means operatively interconnecting said prime mover and said wheel means, a flywheel, and secondary power transmitting means operatively connected to said drive wheel means and to said flywheel, said secondary power transmitting means being effective during a first condition of operation of said vehicle for transmitting energy from said vehicle drive wheel means and into said flywheel as to thereby impart rotation to said flywheel, said secondary power transmitting means being effective during a second condition of operation of said vehicle for transmitting energy from said flywheel during its rotation and into said drive wheel means as to at least assist in propelling said vehicle, said secondary power transmitting means including clutching means to prevent transfer of power from said prime mover to said flywheel and from said flywheel to said prime mover, said clutching means comprising first second third and fourth clutch means, said secondary power transmitting means comprising a first secondary drive train and a second secondary drive train, said first and second clutch means comprising at least a portion of said first secondary drive train, said first clutch means being effective for preventing the transmission of a working torque therethrough except in a first direction of transmission, said second clutch means being effective to vary the magnitude of said working torque transmitted through said first clutch means in said first direction, said third and fourth clutch means comprising at least a portion of said second secondary drive train, said third clutch means being effective for preventing the transmission of a working torque therethrough except in a second direction of transmission opposite to said first direction, and said fourth clutch means being effective to vary the magnitude of said working torque transmitted through said third clutch means in said second direction.

15. An energy storing and supplying system according to claim 14 wherein said first and third clutch means each comprise an over-running one-way clutch assembly, and wherein said second and fourth clutch means each comprise an electromagnetic clutch assembly.

16. An energy storing and supplying system according to claim 15 wherein said first secondary drive train comprises first and second gear means respectively operatively connected at first and second opposite effective ends thereof, wherein said second secondary drive train comprises third and fourth gear means respectively operatively connected at third and fourth opposite effective ends thereof, wherein said first and third gear means are in operative engagement with fifth gear means in turn operatively connected to said drive wheel means, and wherein said second and fourth gear means are in operative engagement with sixth gear means in turn operatively connected to said flywheel.

17. An energy storing and supplying system according to claim 16 wherein said primary power transmitting means comprises a variable speed transmission assembly, drive shaft means operatively coupled to said transmission assembly and to differential gearing means, and wherein said fifth gear means is connected to said drive wheel means by operative connection to said transmission assembly.

18. An energy storing and supply system for a vehicle having an engine for driving the vehicle and surface-engaging vehicle propelling drive wheel means, said system comprising first drive means between the engine and the drive wheel means, said first drive means including a variable speed transmission, a power take-off from said transmission, a flywheel, and a second drive means between said power take-off and said flywheel, said second drive means comprising first and second drive trains, each of said drive trains having one-way over-running clutch means and variable clutch means, said drive trains being incapable of transmitting any energy from said engine to said flywheel during any condition of vehicle operation, said first drive train enabling the drive wheel means to drive the engine and said flywheel through said power take-off during vehicle deceleration whenever the speed of said flywheel is less than the effective speed of said power take-off, and said second drive train enabling said flywheel to drive the drive wheel means upon vehicle acceleration whenever the effective speed of said power take-off is less than the effective speed of said flywheel.

19. An energy storing and supply system for a vehicle having an engine for driving the vehicle and surface-engaging vehicle propelling drive wheel means, said system comprising first drive means between the engine and the drive wheel means, said first drive means including a variable speed transmission, a power take-off from said transmission, a flywheel, and a second drive means between said power take-off and said flywheel, said second drive means comprising first and second parallel drive trains, each of said drive trains having a one-way overrunning clutch and a variable clutch, said first and second drive trains and said clutches being effective to prevent said engine from directly driving said flywheel during any condition of operation of said vehicle, said first drive train and said clutches therein being effective to enable said drive wheel means to drive the engine and said flywheel through said power take-off during vehicle deceleration whenever the speed of said flywheel is less than that of said power take-off, and said second drive train and clutches therein being effective to enable said flywheel to drive the drive wheel means upon vehicle acceleration whenever the speed of said power take-off is less than that of said flywheel.

* * * * *